G. C. EASTMAN.
ROTARY CHURN.
No. 177,108.
Patented May 9, 1876.
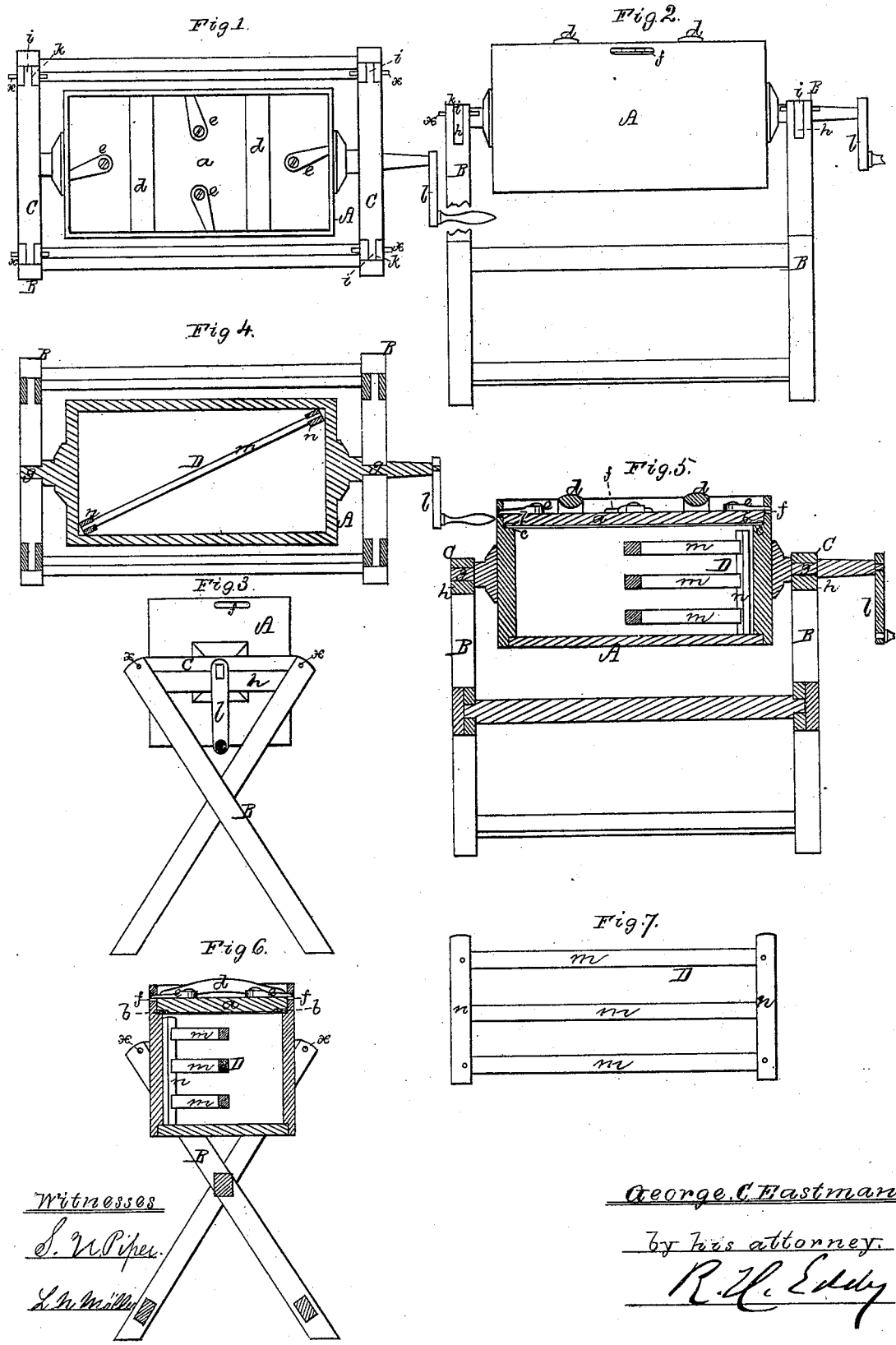
Witnesses
S. N. Piper.
L. N. Miller.
George C. Eastman.
by his attorney.
R. H. Eddy.

UNITED STATES PATENT OFFICE.

GEORGE C. EASTMAN, OF LEWISTON, MAINE.

IMPROVEMENT IN ROTARY CHURNS.

Specification forming part of Letters Patent No. 177,108, dated May 9, 1876; application filed January 12, 1876.

*To all whom it may concern:*

Be it known that I, GEORGE C. EASTMAN, of Lewiston, of the county of Androscoggin and State of Maine, have invented a new and useful Improvement in Churns; and do hereby declare the same to be fully described in the following specification and represented in the accompanying drawings, of which—

Figure 1 is a top view, Fig. 2 a front elevation, Fig. 3 an end view, Fig. 4 a horizontal section, Fig. 5 a longitudinal section, and Fig. 6 a transverse section, of a rotary churn with my improvement. Fig. 7 is a side view of its dasher, which is a grid or grate arranged diagonally within the rotary churn-body or cream-reservoir.

In such drawings, A denotes a rotary receiver, provided in one side with a rabbeted opening to receive a cover, $a$, having along its lower surface, and close to its edge, an elastic water-proof lining, $b$, to rest on the bottom of the rabbet $c$. The said cover I provide with two handles, $d\ d$, and a series of tapering turn-buttons, $e\ e\ e\ e$, the latter being to enter cavities or slots $f\ f\ f\ f$, made through or in the ends and sides of the reservoir. These turn-buttons and slots enable the cover to be held in place and forced down upon its seat, so as to make a close joint between such seat and the cover. The receiver has journaled projections $g\ g$ extending from its ends, and supported in bearings in a stand or frame, B, provided with caps C C, such caps being hinged to the ends of the frame, so as to turn off or on the journals. The said caps, when down upon the cross-bars $h\ h$ of the frame, are held in place by pins $x\ x$ going through the frame and tenons $i\ i$, extended from the caps into open recesses $k\ k$, made in the frame. To one of the projections $g\ g$ a crank, $l$, is fixed for revolving the reservoir. Within the reservoir, and extending across it obliquely or diagonally, and crossing its axis of rotation at acute angles therewith, is a dasher or grid, D, composed of a series of parallel bars, $m\ m\ m$, and two end connecting-bars, $n\ n$, or being otherwise properly made with holes or passages through it. This dasher or grid may be so applied to the reservoir as to be readily removable therefrom, to enable either to be conveniently cleaned, as occasion may require.

In consequence of the dasher or grid being arranged obliquely to the axis of rotation of the reservoir, when the said reservoir is charged and in revolution, such grid causes the liquid contents to rapidly flow lengthwise of the reservoir, as well as to be stirred up and thrown about transversely in it. Whenever the mass of liquid, on either side of the grid, is brought uppermost, there is a tendency of it to flow down the grid, owing to the inclination of the latter to the horizon, such causing or tending to produce currents longitudinally in the reservoir, which, operating with those induced by the rotary motion of it, effect to great advantage the churning of the cream.

I do not claim a churn made as represented in the United States Patent No. 74,954, in which the rotary receiver has within it a perforated diaphragm arranged diagonally, but in range with the axis of rotation of such reservoir, for in my churn the grid D is not so arranged, but crosses the axis of rotation at acute angles therewith, in consequence of which a very different action of the liquid in the reservoir takes place while the reservoir may be in revolution.

What I claim as my invention is—

The rotary churn-reservoir A, provided with the dasher or grid D, arranged diagonally therein, and obliquely to the axis of rotation of such reservoir, all being substantially and to operate as specified.

GEORGE C. EASTMAN.

Witnesses:
R. H. EDDY,
J. R. SNOW.